No. 863,818. PATENTED AUG. 20, 1907.
B. WILLARD.
RAIL BOND.
APPLICATION FILED MAR. 31, 1899.
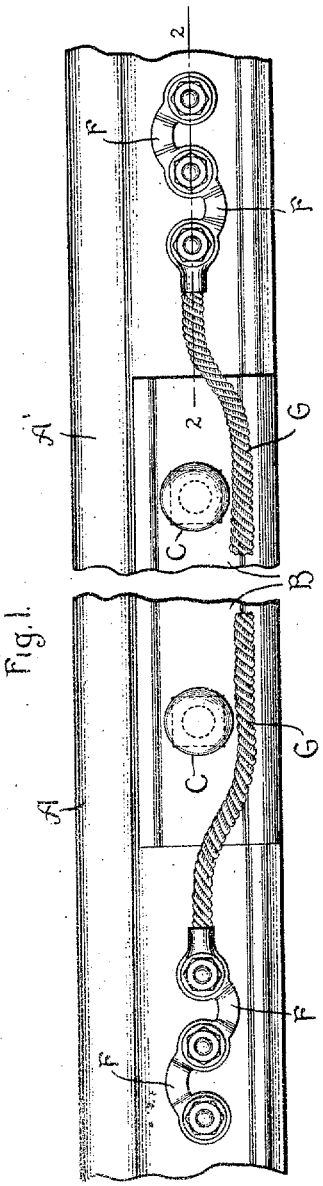
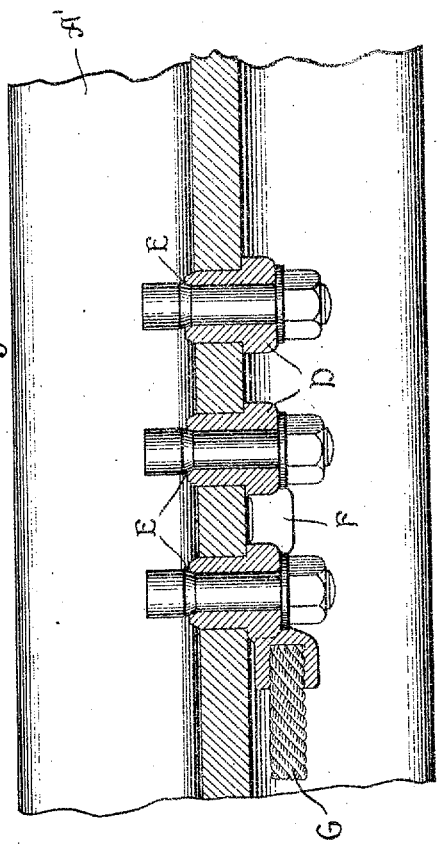
Witnesses
Benjamin B. Hill
Inventor:
Ben Willard
by Albert G. Davis
Atty.

UNITED STATES PATENT OFFICE.

BEN WILLARD, OF NEW ORLEANS, LOUISIANA, ASSIGNOR TO THE GENERAL ELECTRIC COMPANY, A CORPORATION OF NEW YORK.

RAIL-BOND.

No. 863,818.      Specification of Letters Patent.      Patented Aug. 20, 1907.

Application filed March 31, 1899. Serial No. 711,209.

*To all whom it may concern:*

Be it known that I, BEN WILLARD, a citizen of the United States, residing at New Orleans, parish of Orleans, State of Louisiana, have invented certain new and useful Improvements in Rail-Bonds, of which the following is a specification.

My invention relates to electric connectors, such as the rail bonds which are commonly used to join together the track rails, third rails and conduit rails of electric railroads, and has for its object the production of a bond which shall be simple, cheap and of ample carrying capacity.

In modern work the constant tendency is towards an increase in the amount of current taken by each car or train. It is possible to provide bonds of sufficient carrying capacity to provide for any reasonable current, as far as the bond itself is concerned, but the problem of the joint between the bond and the rail becomes a very difficult one, since, while the cross section of the bond increases as the square of its diameter, and directly as its weight, the contact area with the rail increases only as the first power of the diameter, or as the square-root of the weight. A point is then reached at which the ordinary type of bond ceases to gain in efficiency in any reasonable proportion to its increased cost. The difficulty is especially prominent with the expanded type of bond which is the type usually preferred in practice. Another difficulty to which all types of bond are more or less liable, is the tendency to work loose at the joints with the rail, and thus to add to the resistance of the circuit. I avoid these troubles by providing each bond with a plurality of contacts at each point where it is to be connected to the rail, and I avoid the troubles due to unequal expansion by making the bond, between the contacts, of such a shape as to allow a certain amount of change of length without causing a flow of the metal.

In the drawings attached to this specification, which represent a bond constructed in accordance with my invention, Figure 1 is an elevation of a rail joint with my improved bond affixed thereto, and Fig. 2 is a section on an enlarged scale on the line 2—2 of Fig. 1.

A, A¹ are the rails to be bonded, and B is the fish-plate, held in place by bolts C, C. Each rail is drilled with a plurality of holes, as shown in Fig. 2, into which enter the contacts D, D, two or more of which form the terminal of the bond. These contacts are expanded against the rail by bolts E, E, each having a tapered portion which are driven or drawn in place as usual. The contacts forming a terminal are connected together by the parts F, F which, as will be clear from the drawing, are of a spring shape, so that they allow an unequal expansion between the rail and bond without breaking the connection or working them loose.

In the particular form shown, the terminals are connected together by a stranded cable G. The ends of the bonding conductor are secured to the contacts in any suitable manner; as shown in the drawing sockets are provided in two of the contacts and the ends of the conductor secured therein by welding or brazing.

It will be seen that my improved bond provides a greatly increased area of contact between the rail and the bond, and that, at the same time, I eliminate the danger due to unequal expansion.

Having thus described my invention, what I claim as new and desire to secure by Letters Patent of the United States is:

1. A rail bond consisting of a single conductor provided at its ends with a plurality of contacts flexibly connected to each other.

2. A rail bond consisting of a single conductor connected at each end to a plurality of contacts united to each other by yieldable connections.

3. A rail bond consisting of a single conducting cable connected at each end to one of a plurality of contacts connected to each other by yieldable connections.

4. The combination with a flexible conducting cable, of terminals therefor each having means for the attachment of one end of said cable thereto and provided with a plurality of rail connections serially united by flexible conductors.

5. The combination of a flexible conducting cable, of an expansible terminal therefor having a cable receiving connection and a plurality of rail connections attached thereto.

6. The combination with a flexible conducting cable, of a terminal therefor having a cable receiving connection with a plurality of rail connections serially connected thereto by flexible conductors.

In witness whereof, I have hereunto set my hand this 25th day of March, 1899.

BEN WILLARD.

Witnesses:
L. EBERT,
W. P. KILLELEA.